Patented Oct. 5, 1943

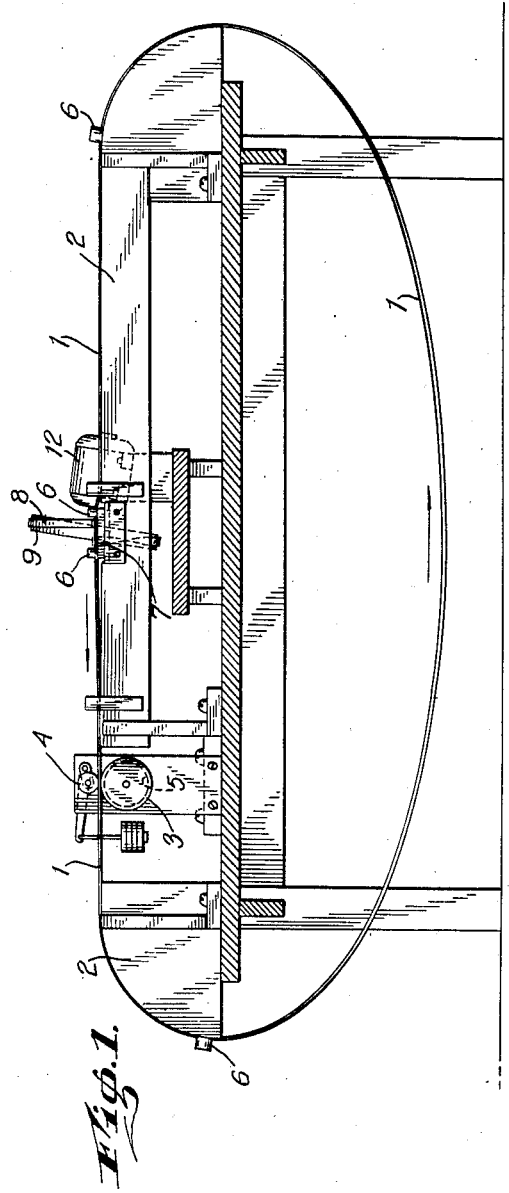
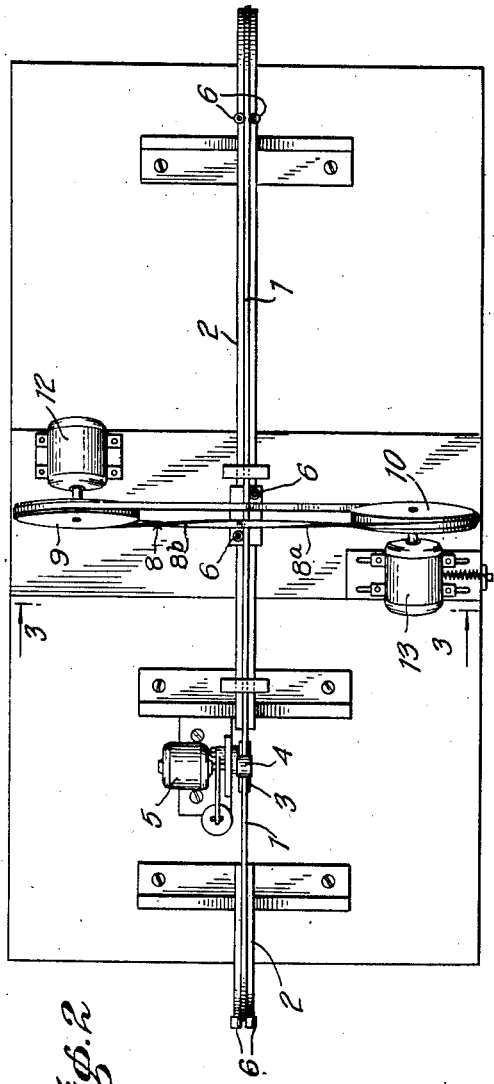

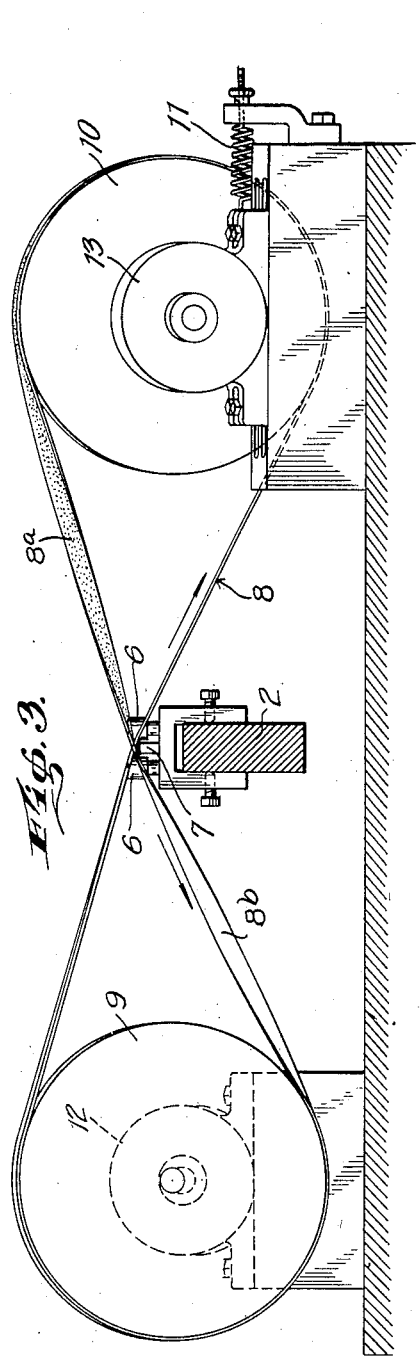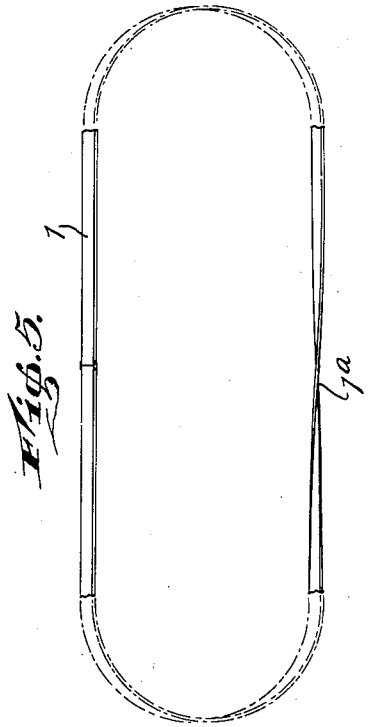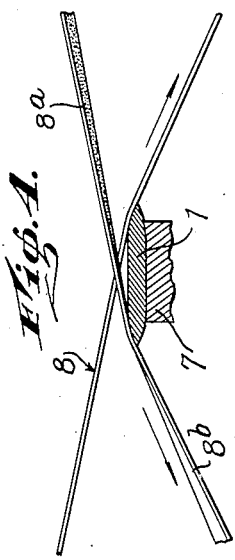

2,331,157

UNITED STATES PATENT OFFICE 2,331,157

PROCESSING STRIP MATERIAL

Ralph G. Arey, Swampscott, Mass.

Application August 1, 1941, Serial No. 404,982

14 Claims. (Cl. 51—285)

The invention relates specifically to the manufacture of razor blades or like cutting tools but involves principles applicable generally to the treatment of strip form material wherein the strip is caused to pass through one or several operating stations where work, such as grinding, polishing or the like, is done upon it. The objects are in general to simplify and reduce the cost of production and to improve the quality, particularly the uniformity, of the product and blades or other articles made from it.

The drawings exhibit one of the ways in which these principles can be carried out and will suffice to illustrate them.

Fig. 1 is a side elevation, partly in section, of apparatus incorporating the invention.

Fig. 2 is a top plan thereof.

Fig. 3 is a cross view of a work station.

Fig. 4 is an enlarged detail thereof; and

Fig. 5 is a contracted side view of the loop of strip material.

In this exemplification the strip to be treated is a ribbon of steel which may be .007" thick and .125" wide, and when ground and sharpened on both edges it can be cut or formed into sections, each constituting a safety razor blade.

A selected length of such strip or ribbon, marked 1 in the drawings, is first made into a closed loop, as by welding or otherwise joining its two ends. The dimensions of the strip are necessarily exaggerated in the drawings. Such loop is placed on a trackway 2 on which it is caused to circulate by means of a pair of rollers 3 and 4 which pull its upper stretch along the trackway in the direction of the arrow while the lower stretch is allowed to hang free below the trackway or is otherwise guided according to its length. The lower roller 3 is driven by a variable-speed motor 5 and the upper roller is lever-weighted as indicated to provide a non-slipping grip on the strip.

The form of the trackway is not of consequence and may be arranged according to the nature of the work to be done, being in any event provided with appropriate means for guiding or retaining the strip to run in a fixed course, and with particular accuracy as it passes through the work station where is located the tool or tools which operate upon it. This guiding function is done in the present case by small rollers 6 which are soft-surfaced so as not to dull a sharp edge in contact with them.

At the work station the trackway is constituted of or includes a narrow rail or work table 7, slightly narrower than the ribbon itself and desirably adjustable on the track structure 2, so as to support the ribbon solidly against the pressure of the members working on it. In the present case all the work performed by the machine is done at a single station but it could be done at successive stations if desired. At the single station indicated in the present apparatus both edges of the ribbon are ground or sharpened and polished by a single abrasive belt, the organization of which represents one of the independent features of this invention.

This belt, 8, is cross-trained over two sheaves 9 and 10 symmetrically located on opposite sides of the trackway or work table, one of them being under the pull of a spring 11 to keep the belt taut. The two stretches of the belt are brought to bear on the ribbon on the work table at their point of crossing and, by virtue of their symmetrical arrangement, each bears upon the ribbon with the same pressure and at a preselected angle, one engaging the edge of the ribbon on one side of its axis and the other engaging the other side as shown in Fig. 4. The twist incident to the crossing of the belt (360°) is divided, part of it (180°) being located at one side of the track, as indicated at 8a, in Fig. 3 and the other part (180°) on the other side of the track, as indicated at 8b, both in the same stretch of the belt.

With this disposition of the twist, the single crossed belt requires to be grit-surfaced on only one of its faces which, besides the economy, affords the special advantage that both margins of the strip receive identical abrasive action, this being the necessary consequence of the fact that they are subject to the same surface at the same speed and at the same pressure.

It is found that in the use of a single belt in this manner both sheaves should be driven and for this purpose, in the present case, each has its own motor 12 and 13 and the two motors are synchronized to rotate at the same surface speed. Also the sheaves are mutually canted through a small angle so that the crossing stretches do not rub on each other.

For certain types of mechanical dry shavers a razor blade with a convex edge rather than the customary concave- or hollow-ground edge, is desirable, and it is apparent that the belt and work table arrangement above described furnish a practical means for producing such an edge.

By circulating the ribbon around the track through the work station and at the proper velocity the abrasive belt or such other tools as may be used to do the work, can be driven at high speed and with a firm pressure on the strip without risk of over-heating or drawing the temper of the latter and without the need of any liquid coolant. It is only required that the speed of the strip or ribbon be correlated to the rate of metal removal so that any point on the ribbon passes out of the operating station before any critical temperature is reached. It then remains merely to cause the loop to make the appropriate number of circuits around the track for removing all of the metal required to be removed. In the return or lower stretch of the ribbon loop the ribbon has ample opportunity to cool off. With the high rate of grinding thus permitted the thinnest stock can be ground and sharpened safely, in a minimum of time and in apparatus which can be fully automatic.

While a high rate of grinding or metal removal is desirable in the initial stages of producing a cutting edge it is necessary to reduce the rate and soften the action as final sharpness is approached. The last stage of sharpening is merely one of polishing, the successive stages being commonly denominated as grinding, honing and stropping. By the method of this invention, as can be performed in the apparatus above described, this sequence in the degree of metal removal rate is produced automatically. The abrasive belt such as 8, when new, is sharp and effective as a grinding agent, adapted to remove metal rapidly. As it wears and its grit particles become dislodged or pulverized it becomes smoother like the hone, and toward the end of its life when no more grit is perceptible upon it, it functions almost wholly as a polisher or stropper. It is practical to use a belt made of paper in which case it is the softer paper backing that does the stropping.

Now the length of metal strip that makes the loop is selected with reference to its own thickness and the known character and useful life of the abrasive belt (of some standard make) so as to bring about the strop condition when the cutting edge has become ready for that final treatment. Thus in its initial circuits through the work station the strip is ground; in its later circuits it is honed, and in its final circuits it receives the stropping. The one tool or belt serves successively as grinder, hone and strop, for the one strip, and the entire operation occurs without danger of over-heating as explained, of or over-sharpening so as to feather the edge because prolonged action of the worn down belt is slow to produce that effect.

Still another and independent feature of the invention consists in the means and method of producing an accurately symmetrical cutting edge, i. e. sharpened as much on one face as on the other. This is accomplished in a simple manner by half-turning the ends of the steel strip when they are joined in the first instance to make the loop. The half-turn is indicated at 1a in Fig. 5 and will be understood to maintain a more or less fixed position at some point in the free run. By working on this twisted loop it will be observed that first one side and then the other side of the strip comes under the action of the working element or elements and, when a single cross-trained abrasive belt is used as above described, the sharpening of both faces of each edge of the ribbon proceeds at an exactly equal rate through the grinding, honing and stropping stages, thus producing a finished ribbon sharpened in perfect balance on both edges throughout the full length of the ribbon.

It will thus be apparent that the manufacture of the razor blades, or other articles, is a simple and largely automatic procedure, consisting merely in making and installing the proper length of loop on the trackway and the selected belt on the belt-sheaves, and then driving the three motors at the appropriate speeds until the belt has ceased to have any beneficial effect, a condition that can be observed by the appearance or feel of the belt itself, at which time the symmetrical sharpening of both edges will be complete. For steel ribbon of the dimensions given a loop length about 13' long driven at one circuit per minute is provided with razor edges in about 15 minutes, the abrasive on the belt being size 120 carborundum. For an extra fine edge the belt is sometimes turned over at the end of the process, so that its plain paper side is against the work, and then used for a few circuits with a polishing compound applied to it.

When the belt is arranged as shown, the effect is to produce an edge convex in cross section and this is desirable for the blades for certain types of dry shavers. The convexity is controlled by the adjustable positions of the work table 7 or of the sheaves 9 and 19 or both. For other shapes of edges including non-symmetrical or chisel edges, the belt stretches can be specially guided in particular courses according to the shape desired and for hollow-ground can be substituted by abrasive wheels, as will be understood, there being no limitation to these particular matters except as specified in the claims hereof.

When the work has been completed the loop is removed from the trackway, cut into sections and its further fabrication into razor blades or other articles done in any appropriate way.

I claim:

1. The method of producing a stropped surface on strip material which comprises uniting the ends of the strip to form a loop, circulating such loop through the action of a tool having a grit-surface on a softer backing and continuing the circulation until the grit is worn away and the backing polishes the strip.

2. The method of processing strip material which comprises reversely uniting the ends of the strip to form a twisted loop, circulating such loop through a work station and performing work upon both sides of it in its passages through said station.

3. The method of making articles from strip material which comprises reversely uniting the ends of the strip to form a twisted loop, circulating such loop over a work table and under the action of a power-driven tool thereby working on both sides thereof and thereafter dividing such loop into sections constituting the articles.

4. The method of sharpening both edges of a metal strip which comprises forming a closed loop of such strip, and circulating the loop through the action of a cross-trained abrasive belt at the crossing point of the stretches thereof.

5. The method of producing a stropped edge on strip material which comprises reversely uniting the ends of the strip to form a loop, circulating such loop through the action of an abrasive tool having a grit-surface on a softer backing and continuing the circulation until the grit is worn away and the backing strops the edge of the strip.

6. The method of producing a stropped edge on both edges of strip material which comprises reversely uniting the ends of the strip to form a loop, circulating the loop through the simultaneous action of crossing abrasive belt-stretches, such belt-stretches having abrasive grit on a softer backing, and continuing the circulation until the grit surface on said stretches is worn away and the softer backing thereof strops the edges of the strip.

7. The method of sharpening both edges of a metal strip which comprises reversely uniting the ends of the strip to form a twisted loop and circulating such loop through the action of a cross-trained abrasive belt at the crossing point of the stretches thereof, and adjusting the twist of said stretches so that said stretches engage the work by the same face.

8. The method of simultaneously sharpening both edges of thin razor-blade strip which comprises pulling such strip in loop form through the action of crossing abrasive belt stretches, at the crossing point thereof, with one edge of the strip obliquely contacting one of such stretches and the other edge similarly contacting the other stretch, driving said stretches respectively in the direction of the taper of the edge being sharpened by it, returning the strip through the action of said stretches until the required amount of material has been removed and thereafter dividing the loop into individual sharpened articles.

9. The method of simultaneously sharpening both edges of thin metallic strip which comprises cross-training a single abrasive belt on two sheaves occupying substantially the same plane, passing the strip to be sharpened through the crotch formed by the crossing belt stretches and so that each edge of the strip obliquely contacts one of such stretches and driving said belt so that each stretch thereby abrades the strip in the direction of the taper of the edge to be sharpened thereby.

10. The method of sharpening both edges of thin metallic strip which comprises cross-training a single abrasive belt having an abrasive coating on one only of its faces, on two supporting sheaves occupying substantially the same plane, passing the strip to be sharpened into the crotch formed by the crossing belts so that each edge of the strip obliquely contacts one of the stretches, adjusting said stretches so that it is the abrasive face of the belt that has such contact in each case and driving the belt in the direction to cause each stretch to sharpen the strip in the direction of the taper of the edge to be sharpened thereby.

11. Apparatus for sharpening both edges of thin razor blade strip comprising a work table adapted for conducting and supporting the strip against the sharpening pressure, means for guiding the strip centrally along the table with its opposite edges overhanging the sides of the table, driving means for causing the strip to travel along said table, and abrading means comprising crossing abrasive belt stretches, means for supporting said stretches so that their crossing point is located substantially centrally over said work table, and means for driving said stretches to cause them to travel respectively from the crossing point toward and over the opposite edges of the strip on the table and each at an acute angle to the plane thereof.

12. Apparatus for sharpening both edges of thin razor blade strip comprising a work table adapted for conducting and supporting the strip against the sharpening pressure, means for guiding the strip centrally along the table to expose its opposite edges for sharpening action, means for pulling the strip along said table, means for returning the strip to the entrance end of the table for repeated travel thereover, and abrading means acting on the strip while on the table comprising a single abrasive belt cross-trained over two sheaves respectively mounted on opposite sides of the table and each in a plane transverse to the table and so that the crossing point of the belt stretches is located substantially centrally over said work table, and means for driving said stretches to cause them to move respectively from the crossing point in directions toward and over the opposite edges of the strip on the table and at an acute angle to the plane thereof.

13. Apparatus as defined in claim 12 in which one-half of the twist in the cross-trained belt occurs on each side of the table, so that the same face of the belt acts on both edges of the strip.

14. Apparatus as defined in claim 12 in which the means for driving the belt stretches comprises two driving agencies, one applied to each of said two sheaves, operating them at exactly equal peripheral speed, whereby each belt stretch is subject to exactly equal tension as it engages the strip.

RALPH G. AREY.